(12) United States Patent
Cabrero et al.

(10) Patent No.: US 11,951,592 B2
(45) Date of Patent: Apr. 9, 2024

(54) SHOT-PEENING POWDER

(71) Applicant: SAINT-GOBAIN CENTRE DE RECHERCHES ET D'ETUDES EUROPEEN, Courbevoie (FR)

(72) Inventors: Julien Cabrero, Salon de Provence (FR); Anne-Laure Beaudonnet, Robion (FR); Yves Léon Marcel Boussant-Roux, Montfavet (FR); Benjamin Gilbert Robert Levy, Marseilles (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 660 days.

(21) Appl. No.: 17/058,369

(22) PCT Filed: May 28, 2019

(86) PCT No.: PCT/EP2019/063808
§ 371 (c)(1),
(2) Date: Nov. 24, 2020

(87) PCT Pub. No.: WO2019/229057
PCT Pub. Date: Dec. 5, 2019

(65) Prior Publication Data
US 2021/0187700 A1    Jun. 24, 2021

(30) Foreign Application Priority Data
May 28, 2018 (FR) ........................ 1854492

(51) Int. Cl.
*B24C 11/00* (2006.01)
*B24C 1/10* (2006.01)
*C04B 35/48* (2006.01)

(52) U.S. Cl.
CPC ................ *B24C 11/00* (2013.01); *B24C 1/10* (2013.01); *C04B 35/481* (2013.01);
(Continued)

(58) Field of Classification Search
CPC ......... B24C 11/00; B24C 1/10; C04B 35/481; C04B 2235/3225; C04B 2235/3229; C04B 2235/5427; C04B 2235/5436
See application file for complete search history.

(56) References Cited

U.S. PATENT DOCUMENTS

2015/0231763 A1*  8/2015  Lemke .................... C22C 38/32
420/64

FOREIGN PATENT DOCUMENTS

FR         1208577 A    2/1960
FR         2925378 A1   6/2009
(Continued)

OTHER PUBLICATIONS

International Search Report corresponding to International Application No. PCT/EP2019/063808 dated Aug. 22, 2019, 5 pages.

*Primary Examiner* — Bryan D. Ripa
*Assistant Examiner* — Cameron K Miller
(74) *Attorney, Agent, or Firm* — Ronald M. Kachmarik; Cooper Legal Group LLC

(57) ABSTRACT

Shot-peening powder that has ceramic particles. The powder having more than 95% by mass of beads. The beads having a median size $D_{50}$ greater than 50 μm and less than 1200 μm, and having a value $(D_{90}-D_{10})/D_{50}$, or "S", such that $S \leq -0.126 \cdot \ln(D_{50}) + 0.980$.

17 Claims, 2 Drawing Sheets

(52) U.S. Cl.
CPC ............... *C04B 2235/3225* (2013.01); *C04B 2235/3229* (2013.01); *C04B 2235/5427* (2013.01); *C04B 2235/5436* (2013.01)

(56) References Cited

FOREIGN PATENT DOCUMENTS

| | | | |
|---|---|---|---|
| JP | 2001113465 A | 4/2001 | |
| JP | 2002114968 A | 4/2002 | |

* cited by examiner

SHOT-PEENING POWDER

TECHNICAL FIELD

The invention relates to a shot-peening process, in particular for the treatment of metal surfaces, for example made of steel, and a powder that can be used in such a process.

PRIOR ART

Shot-peening consists in projecting particles, usually beads, at high speed onto the part to be treated. The particles are made of materials whose hardness is suitable for the objective to be achieved. Steel beads or ceramic beads are commonly used.

Shot-peening can be performed for the purpose of cleaning, for example to remove rust (descaling), to create compressive prestressing of a part's surface, or to change a part's surface appearance, in particular the roughness, brightness, or gloss (cosmetic finishing).

To limit the environmental impact and reduce costs, the beads are conventionally recovered after having been shot, sorted to remove pieces of broken beads, and then reused. Since the bead pieces are not spherical, their projection can indeed lead to an alteration of the part, or even cause it to break. The bead piece rate, i.e. the ratio of the number of bead pieces to the number of particles recovered, should preferably remain below 5%.

Conventionally, sorting involves at least the following three successive operations:
- suction during projection, to remove small particles,
- screening, and
- separation by means of a spiral separator.

Suction and screening allow particles to be selected by size. The spiral separator allows particles to be selected by shape.

Sorting is a complex step that often makes shot-peening slower. In particular, the processing capacities of a spiral separator are low in relation to the projection rates.

There is a need for a shot-peening process that is simpler and that however maintains the amount of bead pieces in the projected powder at a low level.

One purpose of the invention is to meet, at least partially, this need.

SUMMARY OF THE INVENTION

The invention proposes a shot-peening powder consisting of ceramic particles,
- comprising more than 95% by mass of beads,
- having a median size $D_{50}$ greater than 50 μm and less than 1200 μm, and
- having a value $(D_{90}-D_{10})/D_{50}$, or "S", such that
  $S \le -0.126 \cdot \ln(D_{50}) + 0.980$ (1).

As will appear in greater detail below in the description, surprisingly, the projection of such a powder, having an S, or "span", value respecting relation (1), makes it possible to recover a powder which, by simple screening, results in a recycled powder with a very low rate of bead pieces. Recycling of the projected powder is therefore rapid and much less expensive than recycling according to the prior art.

A powder according to the invention may also have one or more of the following optional features:

$S \le -0.116 \cdot \ln(D_{50}) + 0.905$, preferably $S \le -0.114 \cdot \ln(D_{50}) + 0.869$, preferably $S \le -0.107 \cdot \ln(D_{50}) + 0.800$;

The powder includes more than 98% by mass of beads;
The powder includes less than 5% by number of bead pieces;
The powder has a total $ZrO_2 + SiO_2 + Al_2O_3 + CeO_2 + Y_2O_3$ content greater than 80%, in mass percentages on the oxide basis;
The powder has a chemical analysis such that, in mass percentages on the oxide basis and for a total of 100%:
$ZrO_2$: 77%-86%;
$CeO_2$: 14%-19%;
Oxides other than $ZrO_2$ and $CeO_2$: ≤3%;
or such that
$ZrO_2$: 58%-72%;
$SiO_2$: 27%-34%;
$Al_2O_3$: ≤10%;
Oxides other than $ZrO_2$, $SiO_2$ and $Al_2O_3$: ≤5%;
or such that
$ZrO_2$: 89%-96%;
$Y_2O_3$: 3%-8%;
Oxides other than $ZrO_2$ and $Al_2O_3$: ≤3%.

The invention also relates to a shot-peening process comprising the following steps:
a) projection of an initial powder on a surface to be treated of a part;
b) recovery of said projected powder and treatment of said recovered powder so as to obtain a recycled powder;
c) at least partial replacement of said initial powder by said recycled powder so as to obtain a reconditioned powder and return to step a) with the reconditioned powder;

the initial powder being in accordance with the invention.

As will appear in greater detail below in the description, the recycled powder and the reconditioned powder are preferably also in accordance with the invention, even with a treatment of the projected powder that does not involve sorting by means of a spiral separator.

Preferably, the treatment in step b) does not comprise a sorting operation according to the shape of the powder particles, and in particular a sorting operation by means of a spiral separator.

Preferably, the treatment in step b) comprises only one or more operations selected from the group consisting of screening and suction, said suction which may be carried out with or without a size-selection device, such as for example a cyclone. Preferably, the process comprises, as sorting operations, only a screening operation in step b) and, preferably, a suction operation, in particular a suction operation during projection in step a).

The process may also comprise one or more of the following optional features:
- the treatment in step b) consists of screening and, optionally, suction;
- the part is selected from the group consisting of an automobile part, a jewel, a watch, a bracelet, a necklace, a ring, a brooch, a tie pin, a handbag, a piece of furniture, a household utensil, a handle, a button, a plating, a visible part of consumer goods equipment, a part of an eyeglass frame, a dishware item and a frame.

Finally, the invention relates to the use of a process according to the invention for creating compressive prestresses on the surface to be treated, the initial powder having a median size $D_{50}$ greater than 80 μm and less than 1000 μm, or for modifying the appearance of the surface to be treated, the initial powder having a median size $D_{50}$ less than 200 μm.

Definitions

"Bead" means a particle with a sphericity, i.e. a ratio between its smallest Ferret diameter and its largest Ferret diameter, greater than or equal to 0.75, regardless of the way in which this sphericity has been obtained.

"Bead powder" means a powder containing more than 95% by mass of beads.

"Molten product" or "product obtained by melting" means a product obtained by solidification, by cooling, of a bath of molten liquid. A "bath of molten liquid" is a mass which, in order to retain its shape, must be contained in a container. A bath of molten liquid may contain solid portions, but in insufficient quantity for them to be able to structure said mass.

The $10^{th}$ (denoted $D_{10}$), $50^{th}$ (denoted $D_{50}$), $90^{th}$ (denoted $D_{90}$) and $99.5^{th}$ (denoted $D_{99.5}$) percentiles refer to the particle sizes corresponding to percentages equal to 10%, 50%, 90% and 99.5%, respectively, by mass, on the cumulative particle size distribution curve of the powder, said particle sizes being classified in ascending order. According to this definition, 10% by mass of the powder particles have a size smaller than $D_{10}$ and 90% of the particles, by mass, have a size greater than or equal to $D_{10}$. The percentiles are determined using a particle size distribution performed with a laser granulometer.

The "median size" of a particle powder is called the $50^{th}$ percentile. The median size thus divides the particles of the powder into first and second populations of equal mass, these first and second populations containing only particles having a size greater than or equal to, or less than respectively, the median size.

The "maximum size" of a particle powder is called the $99.5^{th}$ percentile.

Where reference is made to zirconia or $ZrO_2$, it should be understood as ($ZrO_2+HfO_2$), with $HfO_2<5\%$, preferably $HfO_2<3\%$, preferably $HfO_2<2\%$ Indeed, a little $HfO_2$, chemically inseparable from $ZrO_2$ and having similar properties, is always naturally present in zirconia sources. Hafnium oxide is therefore not considered as an impurity.

A total content of several oxides, for example $ZrO_2+SiO_2+Al_2O_3+CeO_2+Y_2O_3$, does not imply that each of said oxides is present, even if, in an embodiment, each of said oxides is present.

"Coverage" is the ratio of the surface of the impacted part, i.e. modified by the impact of the projected particles, to the total surface towards which the particle powder is projected, i.e. the surface of the part exposed to the jet of projected particles. Coverage is expressed in percentages. Coverage is therefore less than 100% as long as there are, within the surface that crosses the jet of particles, areas not modified by the impacts of these particles.

The coverage rate, expressed as a percentage, is the ratio of the treatment time to the treatment time to obtain a coverage equal to 98%. Thus, a coverage rate equal to 200% expresses the fact that the treatment time is twice the time required to achieve a coverage of 98%.

A "ceramic" material is conventionally a material that is neither metallic nor organic.

A precursor of an oxide is a constituent which is transformed into said oxide during the manufacture of a powder according to the invention.

Unless otherwise stated, the percentages used to characterize a composition always refer to mass percentages on the oxide basis.

BRIEF DESCRIPTION OF THE FIGURES

Other features and advantages of the invention will also be apparent from reading the detailed description that follows and examining the appended drawing wherein.

DETAILED DESCRIPTION

Process for Manufacturing the Powder

Figure 1:
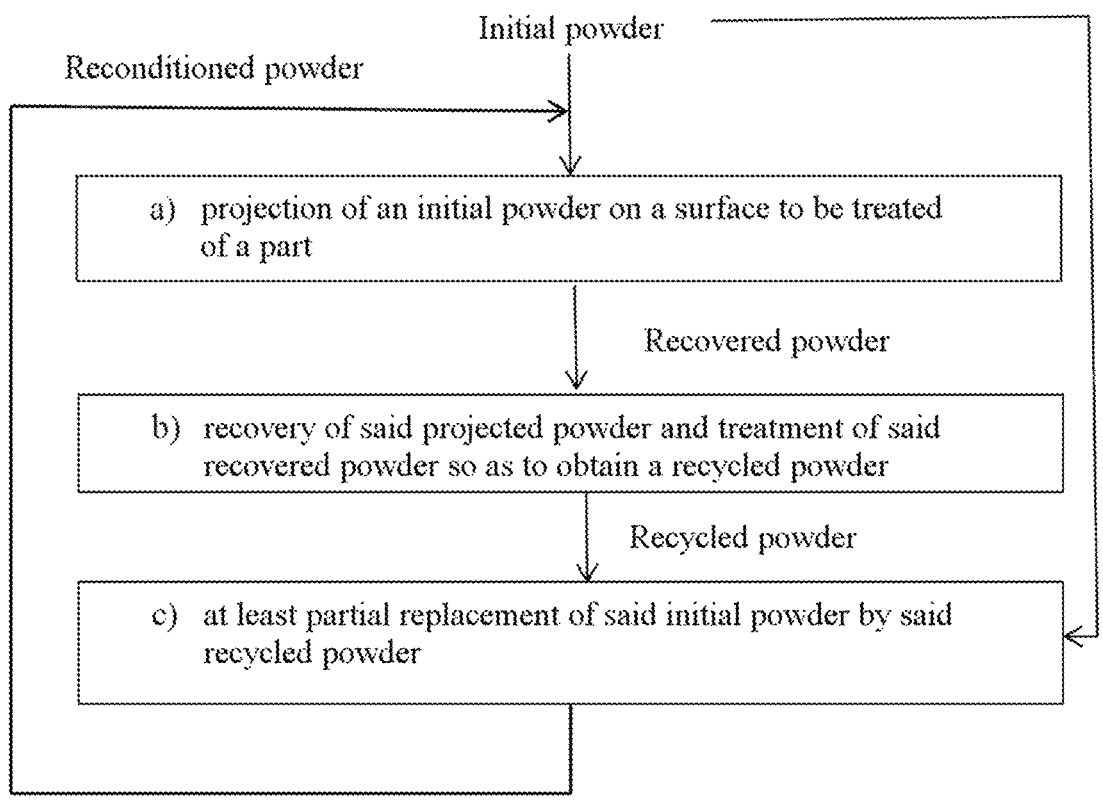
FIG. 1 represents, schematically, the different steps of a process according to the invention.

In order to manufacture a molten bead powder according to the invention, it is possible to proceed according to a process comprising the following steps:
  i) preparation of a feedstock comprising constituents of the beads to be manufactured and/or precursors of these constituents;
  ii) melting of the feedstock to form a bath of molten liquid;
  iii) pouring of the bath so as to form a trickle of molten liquid and dispersion of this trickle in droplets;
  iv) cooling of the droplets so as to form a bead powder;
  v) granulometric selection so that the powder conforms to the invention.

In step i), powders of constituents and/or precursors are mixed so as to form a substantially homogeneous mixture.

The composition of the feedstock is adjusted so as to obtain, at the end of step iv), beads having the desired composition. In the context of the manufacture of ceramic beads, the chemical analysis of the beads is generally substantially identical to that of the feedstock. Furthermore, if need be, the skilled person knows how to adapt the composition of the feedstock to take into account the presence of volatile oxides, or to take into account the loss of $SiO_2$ when melting is carried out under reducing conditions.

In step ii), the feedstock is melted, preferably in an electric arc furnace. Electrofusion indeed allows the production of large quantities of product with advantageous yields. However, all known furnaces can be considered, such as an induction furnace, a solar furnace or a plasma furnace, provided that they allow the feedstock to be melted, preferably completely. The conditions can be oxidizing or reducing.

In step ii), it is possible for example to use the arc melting process described in the French patent no. 1 208 577 and its additions nos. 75893 and 82310.

In step iii), the bath of molten liquid is poured so as to form a trickle and this trickle is dispersed into small liquid droplets which, as a result of the surface tension, take, for the majority of them, a substantially spherical shape. This dispersion can be carried out by blowing, in particular with air and/or water vapor, or by any other process of atomization of a molten material known to the person skilled in the art.

In step iv), the droplets are cooled to solidify in the form of solid beads. Cooling may result from dispersion. The cooling rate can be adapted according to the desired degree of crystallization.

Conventional blow dispersion does not make it possible to obtain a powder having a particle size distribution according to the invention. In step v), the powder obtained therefore preferably undergoes granulometric sorting, for example by screening or by air separation, configured to obtain a particle size distribution according to the invention.

A double screening, at a cut-off value greater than the median size and at a cut-off value less than the median size, reduces the span S in particular. The closer the cut-off values of the two screens, the lower the span S of the screened powder.

To manufacture a sintered bead powder according to the invention, it is possible to proceed according to a process comprising the following steps:
- i') optionally grinding of one or more raw material powders providing constituents of the beads to be manufactured and/or precursors of these constituents, preferably by co-grinding, and dosing of said optionally ground raw material powders, so as to obtain a particulate mixture having a median size of less than 0.6 µm,
- ii') optionally, drying of said particulate mixture,
- iii') preparation of a feedstock from said particulate mixture, optionally dried,
- iv') shaping of the feedstock in the form of raw beads,
- v') optionally, washing,
- vi') optionally, drying,
- vii') sintering so as to obtain a sintered bead powder,
- viii') granulometric selection so that the powder conforms to the invention.

In step i'), the raw material powders may be ground individually or, preferably, co-ground, if their mixture in proportions suitable for the manufacture of ceramic beads having the desired composition does not lead to a particle mixture having a median size of less than 0.6 µm. This grinding can be wet grinding.

Preferably, grinding or co-grinding is carried out in such a way that the median size of said particle mixture is less than 0.5 µm, preferably less than 0.4 µm.

In step ii'), optional, the particulate mixture is dried, for example in an oven or by atomization, in particular if it has been obtained by wet milling. Preferably, the temperature and/or the duration of the drying step is adjusted so that the residual moisture content of the particulate mixture is less than 2%, or even less than 1.5%.

In step iii'), a feedstock adapted to the shaping process of step iv') is prepared, preferably at room temperature, as is well known to the skilled person.

The feedstock may include, in addition to the particulate mixture, a solvent, preferably water, whose amount is adapted to the shaping method of step iv'). The feedstock then consists of the particulate mixture and the solvent.

In step iv'), any conventional shaping process known for the manufacture of sintered beads can be used. Among these processes, mention may be made of:
- granulation processes, employing for example granulators, fluidized bed granulators, or granulation discs,
- gelling processes,
- injection or extrusion molding processes, and
- pressing processes.

The shaping can in particular result from a gelling process. To this end, a solvent, preferably water, is added to the feedstock so as to produce a suspension. The suspension preferably has a dry matter content comprised between 50 and 70% by mass. The suspension may further comprise one or more of the following constituents:
- a dispersant, at a rate of 0 to 10%, in mass percentage on a dry matter basis;
- a surface tension modifier, at a rate of 0 to 3%, in mass percentage on a dry matter basis;
- a gelling agent, at a rate of 0 to 2%, in mass percentage on a dry matter basis.

Dispersants, surface tension modifiers and gelling agents are well known to the skilled person.

The particulate mixture is preferably added to a mixture of water and dispersants/deflocculants, in a ball mill. After stirring, water in which a gelling agent has been previously dissolved is added to obtain a suspension.

In a gelling process, drops of the suspension described above are obtained by flowing the suspension through a calibrated orifice. The drops coming out of the orifice fall into a bath of a gelling solution (electrolyte adapted to react with the gelling agent) where they harden after having recovered a substantially spherical shape.

In step v'), optional, the raw beads obtained in the previous step are washed, for example with water.

In step vi'), optional, the raw beads, optionally washed, are dried, for example in an oven.

In step vii'), the raw beads, optionally washed and/or dried, are sintered. Preferably, sintering is carried out under air, preferably in an electric furnace, preferably at atmospheric pressure.

The sintering temperature and the sintering time are adapted to the composition of the beads.

In step vii'), the powder obtained undergoes a particle size sorting, for example by screening and/or air separation, configured to obtain a particle size distribution according to the invention.

A double screening, at a cut-off value above the median size and at a cut-off value below the median size, reduces the span S. The closer the cut-off values of the two screens, the lower the span S of the screened powder.

Powder

The particles of a powder according to the invention may be in particular in a molten material or in a sintered material.

Preferably, a powder according to the invention comprises, for more than 95%, preferably more than 97%, preferably more than 98%, preferably more than 99%, preferably substantially 100% of its mass, beads and bead pieces.

Beads preferably represent more than 95%, preferably more than 97%, preferably more than 98%, preferably more than 99%, preferably substantially 100% of the mass of the beads and bead pieces.

Preferably, more than 80%, preferably more than 85%, preferably more than 90%, preferably more than 95%, preferably more than 97% by mass of the powder particles each have a sphericity greater than 0.80, preferably greater than 0.85, preferably greater than 0.90, preferably greater than 0.92, preferably greater than 0.94, preferably greater than 0.95.

The median sphericity of the particle powder is preferably greater than 0.80, preferably greater than 0.85, preferably greater than 0.90, preferably greater than 0.92, preferably greater than 0.94, preferably greater than 0.95, preferably greater than 0.97, preferably greater than 0.98.

In an embodiment, the powder thus comprises more than 97%, preferably more than 98%, preferably more than 99% by mass of beads. In particular, before the first projection, the initial powder is preferably substantially made up of beads.

Preferably, after the first projection, the recovered powder is substantially made up of beads and bead pieces resulting from the projection operation.

The inventors discovered the importance of the value of the ratio S of the initial powder on sorting efficiency when screening recovered powder. In particular, preferably $S \leq -0.116 \cdot \ln(D_{50}) + 0.905$, preferably $S \leq -0.114 \cdot \ln(D_{50}) + 0.869$, preferably $S \leq -0.107 \cdot \ln(D_{50}) + 0.800$.

The particle powder has a maximum size of less than 1800 μm, preferably less than 1500 μm.

Preferably, the particle powder has a median size $D_{50}$ greater than 80 μm, preferably greater than 100 μm, preferably greater than 150 μm, preferably greater than 200 μm, preferably greater than 400 μm. This embodiment is particularly suitable for shot-peening. Furthermore, suction losses are reduced and said powder is more versatile. It can in particular be used in pneumatically driven equipment and turbine driven equipment.

In an embodiment, the particle powder has a median size $D_{50}$ greater than 80 μm, preferably greater than 100 μm, preferably greater than 150 μm, preferably greater than 200 μm, preferably greater than 400 μm and/or less than 1000 μm, preferably less than 800 μm. This embodiment is particularly well suited for shot-peening.

In an embodiment, the particle powder has a median size $D_{50}$ of less than 200 μm, preferably less than 150 μm. This process is particularly well suited for shot-peening aimed at modifying the surface appearance of a part (cosmetic finishing).

To improve the efficiency of the shot-peening, the particles preferably have a bulk density greater than 3.0 g/cm³, preferably greater than 3.5 g/cm³, preferably greater than 3.7 g/cm³, preferably greater than 3.8 g/cm³, and/or less than 7.0 g/cm³, preferably less than 6.5 g/cm³, and/or the particles preferably have a hardness greater than 500 $HV_{(0.5/15)}$, preferably greater than 600 $HV_{(0.5/15)}$, preferably greater than 700 $HV_{(0.5/15)}$, preferably greater than 800 $HV_{(0.5/15)}$, preferably greater than 900 $HV_{(0.5/15)}$, and/or preferably less than 1300 $HV_{(0.5/15)}$.

In an embodiment, the powder beads have a polished surface. Advantageously, the treated part has a better fatigue behavior under cyclic loading.

The particles of a powder according to the invention may be in particular made of a material selected from oxides, nitrides, carbides, borides, oxycarbides, oxynitrides and mixtures thereof.

Preferably, the particles consist of oxides for more than 50%, preferably for more than 70%, preferably for more than 90%, preferably for more than 95%, preferably for more than 97%, preferably for more than 99% of their mass.

A powder according to the invention may in particular have one or more of the following compositional features:

The powder has a $ZrO_2$ content greater than 50%, or even greater than 60%, or even greater than 70% and/or less than 96%, or even less than 90%, in mass percentages on the oxide basis;

More than 80%, preferably more than 85%, preferably more than 90% by mass of the powder particles each have a $ZrO_2$ content greater than 50%, or even greater than 60%, or even greater than 70%, and/or less than 96%, or even less than 90%, in mass percentages on the oxide basis;

In an embodiment, the powder has an $SiO_2$ content greater than 10%, or even greater than 15%, or even greater than 20%, or even greater than 25% and/or less than 45%, or even less than 40%, in mass percentages on the oxide basis;

In an embodiment, more than 80%, preferably more than 85%, preferably more than 90% by mass of the powder particles each have an $SiO_2$ content greater than 10%, or even greater than 15%, or even greater than 20%, or even greater than 25% and/or less than 45%, or even less than 40%, in mass percentages on the oxide basis;

In an embodiment, the powder has an $SiO_2$ content of less than 10%, or even less than 5%, or even less than 1%, in mass percentages on the oxide basis;

In an embodiment, more than 80%, preferably more than 85%, preferably more than 90% by mass of the powder particles each have an $SiO_2$ content of less than 10%, or even less than 5%, or even less than 1%, in mass percentages on the oxide basis;

In an embodiment, the powder has an $Al_2O_3$ content of less than 15%, or even less than 10%, or even less than 5%, or even less than 3%, in mass percentages on the oxide basis;

More than 80%, preferably more than 85%, preferably more than 90% by mass of the powder particles each have an $Al_2O_3$ content of less than 15%, or even less than 10%, or even less than 5%, or even less than 3%, in mass percentages on the oxide basis;

In an embodiment, the powder has a $CeO_2$ content greater than 10%, preferably greater than 14% and/or less than 20%, preferably less than 19%, in mass percentages on the oxide basis;

In an embodiment, more than 80%, preferably more than 85%, preferably more than 90% by mass of the powder particles each have a $CeO_2$ content greater than 10%, preferably greater than 14% and/or less than 20%, preferably less than 19%, in mass percentages on the oxide basis;

In an embodiment, the powder has a $Y_2O_3$ content greater than 2%, preferably greater than 3% and/or less than 10%, preferably less than 8%, in mass percentages on the oxide basis;

In an embodiment, more than 80%, preferably more than 85%, preferably more than 90% by mass of the powder particles each have a $Y_2O_3$ content greater than 2%, preferably greater than 3% and/or less than 10%, preferably less than 8%, in mass percentages on the oxide basis;

The powder has a total $ZrO_2+SiO_2+Al_2O_3+CeO_2+Y_2O_3$ content greater than 80%, even greater than 90%, even greater than 95%, in mass percentages on the oxide basis;

More than 80%, preferably more than 85%, preferably more than 90% by mass of the powder particles each have a total $ZrO_2+SiO_2+Al_2O_3+CeO_2+Y_2O_3$ content greater than 80%, preferably greater than 90%, preferably greater than 95%, in mass percentages on the oxide basis;

More than 80%, preferably more than 85%, preferably more than 90% by mass of the powder particles have substantially the same chemical analysis;

In an embodiment, the powder, preferably the powder and more than 80%, preferably more than 85%, preferably more than 90% by mass of the powder particles have the following chemical analysis, in mass percentages on the oxide basis and for a total of 100%:
$ZrO_2$: 77%-86%;
$CeO_2$: 14%-19%;
Oxides other than $ZrO_2$ and $CeO_2$: ≤3%.

In an embodiment, the powder, preferably the powder and more than 80%, preferably more than 85%, preferably more than 90% by mass of the powder particles have the following chemical analysis:
$ZrO_2$: 58%-72%;
$SiO_2$: 27%-34%;
$Al_2O_3$: ≤10%;
Oxides other than $ZrO_2$, $SiO_2$ and $Al_2O_3$: ≤5%;

In an embodiment, the powder, preferably the powder and more than 80%, preferably more than 85%, preferably more than 90% by mass of the particles of the powder have the following chemical analysis, in mass percentages on the oxide basis and for a total of 100%:

$ZrO_2$: 89%-96%;
$Y_2O_3$: 3%-8%;
Oxides other than $ZrO_2$ and $Al_2O_3$: ≤3%.

Shot-Peening Process

In step a), the initial powder is projected onto the surface of a part to be treated in the first cycle of steps a) to c), and then the reconditioned powder is projected in subsequent cycles.

All known shot-peening techniques can be employed.

Preferably, no metal particles are projected. Preferably only ceramic particles are projected.

In an embodiment, step a) comprises only a single projection operation, i.e. after projection said initial powder and the reconditioned powder, preferably several times, no subsequent projection operation is carried out. In an embodiment, the process does not comprise a step of projection of a medium other than a powder according to the invention.

Preferably, projection is carried out by means of a compressed air shot-peening machine, preferably with Venturi effect or with direct pressure, preferably with direct pressure, or by means of a turbine shot-peening machine(s).

Preferably, the particles are projected at a velocity greater than 40 m/s, preferably greater than 48 m/s, or even greater than 50 m/s, or even greater than 55 m/s.

Preferably still, the particles are projected in a direction forming a projection angle with the surface to be treated, the projection angle, i.e. the angle between the surface to be treated and said direction (the axis of the jet of the projected particles), being preferably greater than 45°, preferably greater than 50°.

The particles are projected by passing through a nozzle arranged at a distance, called the "projection distance", from the surface to be treated, said projection distance being preferably greater than 5 cm, preferably greater than 10 cm and/or preferably less than 30 cm, preferably less than 25 cm.

The projection nozzle of the shot-peening machine preferably has a diameter greater than 6 mm, preferably greater than 7 mm, and/or less than 15 mm, preferably less than 12 mm.

The particles are projected onto the surface by being carried by a fluid, preferably air, whose overpressure (additional pressure above atmospheric pressure) is preferably greater than 0.5 bar, preferably greater than 1 bar and/or preferably less than 4 bar, preferably less than 3 bar.

Preferably, the process includes suction, preferably during the projection step a), in order to limit the amount of small particles.

The particles are projected with a coverage rate preferably greater than 100%, preferably greater than 120%, even greater than 150% and/or preferably less than 300%, preferably less than 250%, preferably less than 200%.

The surface to be treated can undergo, before projection treatment, a pre-treatment, for example polishing, for example mirror-type. In an embodiment, the surface to be treated does not have a coating. In an embodiment, the surface to be treated is made of a metallic material, preferably in the form of a metal or a metal alloy, preferably steel, aluminum or titanium.

The surface to be treated can be a surface of an automobile part, and in particular can be selected from a pinion, a drive shaft, a spring, a torsion bar, a connecting rod, and a crankshaft.

In an embodiment, the surface to be treated is a surface of a part selected from the group consisting of a jewel, a watch, a bracelet, a necklace, a ring, a brooch, a tie pin, a handbag, a piece of furniture, a household utensil, a handle, a button, a plating, a visible part of a consumer goods equipment, a part of an eyeglass frame, a dishware item and a frame.

In step b), the particles that have been projected onto the surface to be treated are recovered. Conventionally, after striking the surface to be treated, the particles fall to the bottom of the projection booth, where they can be recovered.

Conventionally, the powder initially projected consists essentially of beads. A part of these beads break on impact against the surface to be treated. The recovered powder is then substantially made up of the pieces of broken beads and the beads that resisted the impact.

The recovered powder then undergoes a sorting operation in order to limit the bead piece rate. Surprisingly, a simple screening operation, for example on a square-mesh screen, separates a substantial part of the bead pieces. The mesh size of the screen is adapted according to the particle size of the projected powder. Simple tests make it possible to optimize the mesh to maximize the quantity of bead pieces extracted.

Preferably, step b) does not comprise a sorting operation according to the shape of the particles, for example by means of a spiral separator.

The powder recovered and treated to extract bead pieces (or "recycled powder") is advantageously adapted for a new projection. In particular, it can be immediately returned to the shot-peening machine to be projected again.

The recycled powder can also be pre-mixed with initial powder.

The amount of initial powder in the reconditioned powder is preferably adjusted to compensate for the quantity of beads extracted during the treatment of step b). In other words, preferably all the recycled powder is re-injected and supplemented, as much as necessary, with the initial powder.

"Reconditioned powder" is the powder that is projected after the first cycle of steps a) to c).

In step c), the reconditioned powder (recycled powder or a mixture of recycled powder and initial powder) thus partially or even totally replaces the initial powder, and then the process resumes in step a) with the reconditioned powder.

Examples

The following non-limiting examples are given with the aim of illustrating the invention.

Measurement Protocols

To determine the sphericity of a bead, the smallest and largest Ferret diameters are measured on a Camsizer XT marketed by the firm Horiba.

The bulk density of a powder was measured using an Accupyc 1330 automatic helium pycnometer.

The microhardness was measured using a Zwick 3212 Vickers microhardness tester. The values are obtained from Vickers indentations at a load of 0.5 kg, said load being applied for a time equal to 15 seconds ($HV_{(0.5/15)}$).

The chemical analysis of the powders was determined by X-ray fluorescence.

Particle size analysis was performed using a Camsizer XT laser particle size analyzer marketed by the firm Horiba.

To determine the capacity, for an initial powder, to be recycled after a simple screening, a quantity of 100 g of said powder was projected, with recirculation on a surface to be treated in XC65 steel, by means of a Venturi effect gun equipped with a projection nozzle of 8 mm diameter, disposed 150 mm from the surface to be treated, with a projection angle of 85° and at an overpressure equal to 4 bar. The projection was continued for 10 minutes.

At the end of the treatment, the particles having struck the surface to be treated (constituting the recovered powder) were recovered and screened using a square-mesh screen with an opening equal to "X" μm. Only the screen rejection (recycled powder) was retained.

Photographs of at least 600 particles of the recycled powder were taken, using an optical microscope or a scanning electron microscope, depending on the median size of the powder, with each photograph representing between 100 and 200 particles.

Figure 2:
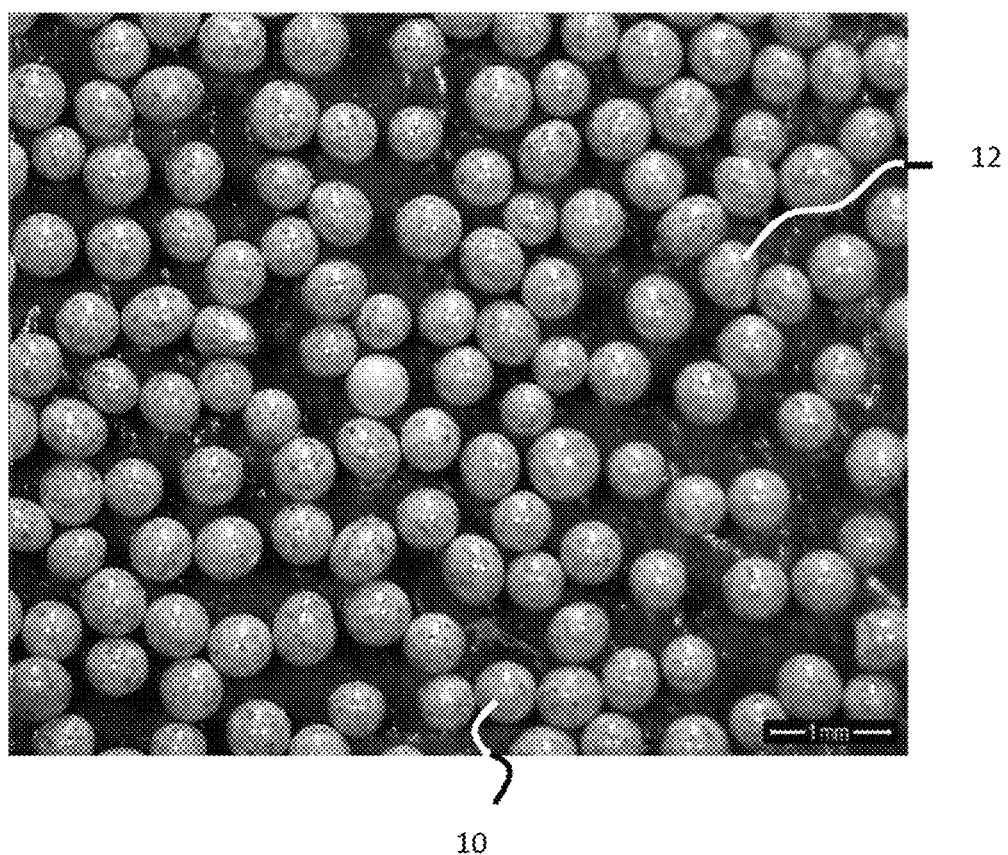
FIG. 2 represents a photograph of a recycled powder on which the beads 10 and the bead pieces 12 can be distinguished.

The number of beads and the number of bead pieces were determined on each image. The bead pieces can be easily recognized by the fact that they have edges (see FIG. 2). The bead piece rate is evaluated by the total number of bead pieces divided by the total number of particles observed.

The results are considered particularly satisfactory if the bead piece rate is less than or equal to 5%, preferably less than or equal to 4%, preferably less than or equal to 3%, preferably less than or equal to 2%, preferably less than or equal to 1%.

Tested Powders

The powders of Examples 2, 4 and 6 are intended to serve as a basis for comparison for the powders of Examples 1, 3 and 5, respectively. Two powders are comparable only if they have substantially identical median sizes.

The initial powder of Example 1, outside the invention, is a Microblast® B120 bead powder marketed by the firm Saint-Gobain Zirpro.

The initial powder of Example 2, according to the invention, is a Microblast® B120 bead powder, which has been screened so as to recover the beads passing through a square-mesh screen with an opening equal to 106 μm and not passing through a square-mesh screen with an opening equal to 90 μm, said screening being carried out on an AS 200 screening machine marketed by the firm Retsch. This treatment made it possible to obtain a particle size distribution according to the invention.

The initial powder of Example 3, outside the invention, is a Zirshot® Z425 bead powder marketed by the firm Saint-Gobain Zirpro.

The initial powder of Example 4, according to the invention, is a Zirshot® Z425 bead powder, which has been screened so as to recover the beads passing through a square-mesh screen with an opening equal to 450 μm and not passing through a square-mesh screen with an opening equal to 540 μm, said screening being carried out on an AS 200 screening machine marketed by the firm Retsch. This treatment made it possible to obtain a particle size distribution according to the invention.

The initial powder of Example 5, outside the invention, is a Zirshot® Z850 bead powder marketed by the form Saint-Gobain Zirpro.

The initial powder of Example 6, according to the invention, is a Zirshot® Z850 bead powder, which has been screened so as to recover the beads passing through a square-mesh screen with an opening equal to 900 μm and not passing through a square-mesh screen with an opening equal to 1000 μm, said screening being carried out on an AS 200 screening machine marketed by the firm Retsch. This treatment made it possible to obtain a particle size distribution according to the invention.

After projection test, the powders of the examples were screened using a square-mesh screen with an opening equal to X μm as shown in the following Table 1.

TABLE 1

| Example | 1(*) | 2 | 3(*) | 4 | 5(*) | 6 |
|---|---|---|---|---|---|---|
| X (μm) | 63 | 63 | 425 | 425 | 850 | 850 |

(*)outside the invention

Results

The results are shown in Table 2 below.

TABLE 2

| | | Examples | 1(*) | 2 | 3(*) | 4 | 5(*) | 6 |
|---|---|---|---|---|---|---|---|---|
| Features of the initial bead powders | | | | | | | | |
| Chemical analysis (in % by mass based on oxides) | | $ZrO_2$ | | | | 65.6 | | |
| | | $SiO_2$ | | | | 28.8 | | |
| | | $Al_2O_3$ | | | | 4.8 | | |
| | | Other oxides | | | | 0.8 | | |
| Particle size features | | $D_{50}$ (μm) | 92 | 95 | 500 | 478 | 1012 | 1010 |
| | | $D_{99.5}$ (μm) | 183 | 168 | 826 | 752 | 1450 | 1433 |
| | | $D_{90}$ (μm) | 127 | 112 | 587 | 525 | 1090 | 1065 |
| | | $D_{10}$ (μm) | 61 | 80 | 433 | 440 | 919 | 959 |
| | | $S = ((D_{90} - D_{10})/D_{50})$ | 0.72 | 0.34 | 0.31 | 0.18 | 0.17 | 0.10 |
| | | $-0.126 \cdot \ln(D_{50}) + 0.980$ | 0.41 | 0.41 | 0.20 | 0.20 | 0.11 | 0.11 |
| | | $-0.116 \cdot \ln(D_{50}) + 0.905$ | 0.38 | 0.38 | 0.18 | 0.19 | 0.10 | 0.10 |
| | | $-0.114 \cdot \ln(D_{50}) + 0.869$ | 0.35 | 0.35 | 0.16 | 0.17 | 0.08 | 0.08 |
| | | $-0.107 \cdot \ln(D_{50}) + 0.800$ | 0.32 | 0.31 | 0.14 | 0.14 | 0.06 | 0.06 |
| Other physical features | | Median sphericity | 0.89 | 0.90 | 0.95 | 0.95 | 0.95 | 0.95 |
| | | bulk density (g/cm³) | 3.85 | 3.85 | 3.85 | 3.85 | 3.85 | 3.85 |
| | | Hardness HV $_{(0.5/15)}$ | 700 | 700 | 700 | 700 | 700 | 700 |
| Result after projection test | | | | | | | | |
| | | Bead piece rate (%) | 7 | 4 | 7 | 4 | 6 | 3 |

(*)outside the invention

A comparison of Example 1, outside the invention, and of Example 2 shows that after projection, a single screening operation using a square-mesh screen with an opening equal to 63 μm makes it possible to obtain bead piece rates of 4% in the powder according to the invention and 7% in the comparative powder.

A comparison of Example 3, outside the invention, and of Example 4 shows that, after projection, a single screening operation using a square-mesh screen with an opening equal to 425 μm makes it possible to obtain bead piece rates of 4% in the powder according to the invention and 7% in the comparative powder.

A comparison of Example 5, outside the invention, and of Example 6 shows that, after projection, a single screening operation using a square-mesh screen with an opening equal to 850 μm makes it possible to obtain bead piece rates of 3% in the powder according to the invention and 6% in the comparative powder.

As is now clear, the invention makes it possible to reduce the bead piece rate by 42% to 50% to values allowing immediate recycling, even though it only implements much simpler sorting means than those used up to now.

Of course, the invention is not limited to the examples and embodiments described above.

The invention claimed is:

1. A shot-peening powder consisting of ceramic particles, comprising more than 95% by mass of beads with a sphericity greater than or equal to 0.75,
having a median size $D_{50}$ greater than 50 μm and less than 1200 μm, and
having a value $(D_{90}-D_{10})/D_{50}$, or "S", such that $$S \leq -0.126 \cdot \ln(D_{50}) + 0.980 \quad (1)$$

$D_{10}$, $D_{50}$ and $D_{90}$ being particle sizes corresponding to the percentages equal to 10%, 50% and 90% by volume, respectively, on the cumulative particle size distribution curve of the powder, said particle sizes being ranked in ascending order and being expressed in μm.

2. The powder as claimed in claim 1, wherein $$S \leq -0.116 \cdot \ln(D_{50}) + 0.905.$$

3. The powder as claimed in claim 2, wherein $$S \leq 0.114 \cdot \ln(D_{50}) + 0.869.$$

4. The powder as claimed in claim 3, wherein $$S \leq -0.107 \cdot \ln(D_{50}) + 0.800.$$

5. The powder as claimed in claim 1, comprising more than 98% by mass of said beads.

6. The powder as claimed in claim 1, comprising less than 5% by number of bead pieces.

7. The powder as claimed in claim 1, having a total $ZrO_2+SiO_2+Al_2O_3+CeO_2+Y_2O_3$ content greater than 80%, in mass percentages on the oxide basis.

8. The powder as claimed in claim 1, having a chemical analysis such that, in mass percentages on the oxide basis and for a total of 100%:
$ZrO_2$: 77%-86%;
$CeO_2$: 14%-19%;
Oxides other than $ZrO_2$ and $CeO_2$: ≤3%.

9. A shot-peening process comprising the following steps:
a) projection of an initial powder on a surface of a part to be treated;
b) recovery of said projected powder and treatment of said recovered powder so as to obtain a recycled powder;
c) at least partial replacement of said initial powder by said recycled powder so as to obtain a reconditioned powder, and return to step a) with the reconditioned powder;
the initial powder being in accordance with claim 1.

10. The process as claimed in claim 9, wherein the treatment in step b) does not comprise a sorting operation according to the shape of the powder particles.

11. The process as claimed in claim 9, wherein the treatment in step b) does not comprise a sorting operation by means of a spiral separator.

12. The process as claimed in claim 9, wherein the treatment in step b) consists of screening and, optionally, suction.

13. The process as claimed in claim 9, wherein the part is selected from the group consisting of an automobile part, a piece of jewelry, a watch, a bracelet, a necklace, a ring, a brooch, a tie pin, a handbag, a piece of furniture, a household utensil, a handle, a button, a plating, a visible part of a consumer goods equipment, a part of a eyeglass frame, dishware item, and a frame.

14. A method for creating compressive prestressing on a surface of a part to be treated, said method comprising the following steps:
a) projection of an initial powder on the surface;
b) recovery of said projected powder and treatment of said recovered powder so as to obtain a recycled powder;
c) at least replacement of said initial powder by said recycled powder so as to obtain a reconditioned powder, and return to step a) with the reconditioned powder;
the initial powder being in accordance with claim 1 and having a median size $D_{50}$ greater than 80 μm and less than 1000 μm.

15. A method for modifying the appearance of a surface of a part to be treated, said method comprising the following steps:
a) projection of an initial powder on the surface;
b) recovery of said projected powder and treatment of said recovered powder so as to obtain a recycled powder;
c) at least partial replacement of said initial powder by said recycled powder so as to obtain a reconditioned powder and return to step a) with the reconditioned powder:
the initial powder being in accordance with claim 1 and having a median size $D_{50}$ less than 200 μm.

16. The powder as claimed in claim 1, having a chemical analysis such that, in mass percentages on the oxide basis and for a total of 100%:
$ZrO_2$: 58%-72%;
$SiO_2$: 27%-34%;
$Al_2O_3$: ≤10%;
Oxides other than $ZrO_2$, $SiO_2$ and $Al_2O_3$: ≤5%.

17. The powder as claimed in claim 1, having a chemical analysis such that, in mass percentages on the oxide basis and for a total of 100%:
$ZrO_2$: 89%-96%;
$Y_2O_3$: 3%-8%;
Oxides other than $ZrO_2$ and $Al_2O_3$: ≤3%.

* * * * *